US007650998B2

(12) United States Patent
Tanaka et al.

(10) Patent No.: US 7,650,998 B2
(45) Date of Patent: Jan. 26, 2010

(54) APPARATUS OF TREATING GRINDING WATER FOR PROCESSING PERIPHERY OF EYEGLASS LENS

(75) Inventors: Motoshi Tanaka, Gamagori (JP); Akihiro Nagura, Okazaki (JP); Kenichi Inaishi, Okazaki (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 11/848,286

(22) Filed: Aug. 31, 2007

(65) Prior Publication Data

US 2008/0053887 A1 Mar. 6, 2008

(30) Foreign Application Priority Data

Aug. 31, 2006 (JP) .......................... P.2006-236306
Dec. 27, 2006 (JP) .......................... P.2006-351403
Aug. 9, 2007 (JP) .......................... P.2007-208666

(51) Int. Cl.
*B04B 3/00* (2006.01)
*C02F 1/38* (2006.01)
*B24B 55/03* (2006.01)
*B24B 9/14* (2006.01)

(52) U.S. Cl. .................... 210/380.1; 210/382; 210/297; 451/450; 451/255

(58) Field of Classification Search .............. 210/380.1, 210/382; 451/450, 255
See application file for complete search history.

(56) References Cited

U.S. PATENT DOCUMENTS 3,464,554 A 9/1969 Laut
4,122,008 A * 10/1978 Allen .......................... 210/777
4,613,437 A * 9/1986 Wiand .......................... 210/315
6,672,948 B2 * 1/2004 Mizuno .......................... 451/60
6,974,369 B2 * 12/2005 Mizun .......................... 451/255

FOREIGN PATENT DOCUMENTS

JP 2002-283236 A 10/2002
JP 2002283236 A * 10/2002
JP 2003-156718 A 5/2003
JP 2004-243452 A 9/2004
JP 2004243452 A * 9/2004
JP 2005-153134 A 6/2005

* cited by examiner

*Primary Examiner*—Thomas M Lithgow
(74) *Attorney, Agent, or Firm*—Sughrue Mion, PLLC

(57) ABSTRACT

A grinding water treating apparatus for separating a processing refuse from grinding water used for processing a periphery of an eyeglass lens, the grinding water being introduced from an eyeglass lens processing apparatus, the grinding water treating apparatus includes: a centrifugal separator that includes a dewatering tank having a bottom surface and a side surface and a drive source for rotating the dewatering tank, and springs out the grinding water to an upper portion of the dewatering tank by rotating the dewatering tank; and a drain pipe that introduces the grinding water from an upper portion of the dewatering tank. The centrifugal separator includes a filter arranged at the upper portion of the dewatering tank and having an opening inserted with the drain pipe for filtering the grinding water separated from the processing refuse by a centrifugal force generated due to rotation of the dewatering tank.

8 Claims, 13 Drawing Sheets

APPARATUS OF TREATING GRINDING WATER FOR PROCESSING PERIPHERY OF EYEGLASS LENS

BACKGROUND OF THE INVENTION

The present invention relates to a grinding water treating apparatus for separating a processing refuse from grinding water discharged from an eyeglass lens processing apparatus to treat the processing refuse.

As an apparatus of treating grinding water for processing an eyeglass lens, there is known an apparatus for separating grinding water and a processing refuse by a centrifugal separator (refer to, for example, JP-A-2002-283236, JP-A-2005-153134). A centrifugal separator described in JP-A-2002-283236 (hereinafter, Patent Reference 1) includes a rotating cylinder as a dewatering tank, and a lid member attached to an upper portion of the rotating cylinder and having an opening at a center of rotation. Further, the centrifugal separator is of a type of springing out grinding water from the opening of the lid member by a centrifugal force. A centrifugal separator described in JP-A-2005-153134 (hereinafter, Patent Reference 2) is of a type of providing a filter at a side wall of a rotating dewatering tank and making grinding water flow out by a centrifugal force by passing the filter.

In the means time, the type of the centrifugal separator of Patent Reference 2 will be explained. An operator takes out a processing refuse of the dewatering tank integrally with the filter, thereafter, put the processing refuse to a waste bag of a vinyl bag or the like to through away. At this occasion, time and labor are taken and the hand of the operator is liable to become dirty.

According to the type of Patent Reference 1, an attachable and detachable inner lining bag of a vinyl bag or the like is mounted to the rotating cylinder and the processing refuse can easily be taken out without dirtying the hand of the operator. However, according to the type of springing out the grinding water from the upper portion as in Patent Reference 1, the grinding water is sprung only from the opening at the center of the lid member to discharge to outside. Therefore, water is liable to remain at inside thereof, and water is liable to remain also at the taken-out processing refuse. Further, the grinding water is sprung to outside only from the opening of the center of the lid member, and therefore, the processing refuse is liable to mix with the grinding water.

SUMMARY OF THE INVENTION

It is a technical problem of the invention to provide a grinding water treating apparatus capable of easily treating a processing refuse and promoting a dewatering efficiency and a filtering efficiency of a processing refuse.

In order to resolve the above-described problem, the invention is characterized by providing the following constitution.

(1) A grinding water treating apparatus for separating a processing refuse from grinding water used for processing a periphery of an eyeglass lens, the grinding water being introduced from an eyeglass lens processing apparatus, the grinding water treating apparatus comprising:

a centrifugal separator that includes a dewatering tank having a bottom surface and a side surface and a drive source for rotating the dewatering tank, and springs out the grinding water to an upper portion of the dewatering tank by rotating the dewatering tank; and a drain pipe that introduces the grinding water from an upper portion of the dewatering tank;

wherein the centrifugal separator includes a filter arranged at the upper portion of the dewatering tank and having an opening inserted with the drain pipe for filtering the grinding water separated from the processing refuse by a centrifugal force generated due to rotation of the dewatering tank.

(2) The grinding water treating apparatus according to (1), wherein an interval between the filter and the drainpipe includes a gap for overflowing the grinding water which cannot be filtered by the filter when the processing refuse is stored at an inner portion of the dewatering tank, the gap having a size in which a water amount overflowed by rotating the dewatering tank through the gap exceeds a water amount introduced from the drain pipe.

(3) The grinding water treating apparatus according to (1), wherein the filter is formed by a nonwoven cloth and is provided with an air flow quantity of 60-110 $cm^3/cm^2 \cdot sec$.

(4) The grinding water treating apparatus according to (1), where in the dewatering tank includes a center bottom portion projected to an upper side of a peripheral bottom portion, and the drain pipe or a surrounding of the drain pipe includes a grinding water introducing guide extended to a position lower than a topmost portion of the center bottom portion for guiding the grinding water to the center bottom portion.

(5) The grinding water treating apparatus according to (4), wherein the filter includes an opening larger than an inner diameter of the grinding water introducing guide, and the opening forms a gap between the filter and the grinding water introducing guide, the gap having a size of passing the processing refuse included in the grinding water along with the grinding water which cannot be filtered by the filter when the processing refuse is deposited on an inner portion of the dewatering tank.

(6) The grinding water treating apparatus according to (1), further comprising a cylindrical member surrounding the drain pipe inserted to the opening of the filter, the cylindrical ember being projected to a lower side of the filter.

(7) The grinding water treating apparatus according to (6), wherein a lower side opening of the drain pipe is disposed on a lower side of a lower side opening of the cylindrical member.

(8) The grinding water treating apparatus according to (1), wherein the filter is constituted by a shape of plane brought into a positional relationship substantially in a vertical direction relative to a rotating shaft of the dewatering tank.

DESCRIPTION OF PREFERRED EMBODIMENTS

An embodiment of the invention will be explained in reference to the drawings as follows.

First Embodiment

Figure 1:
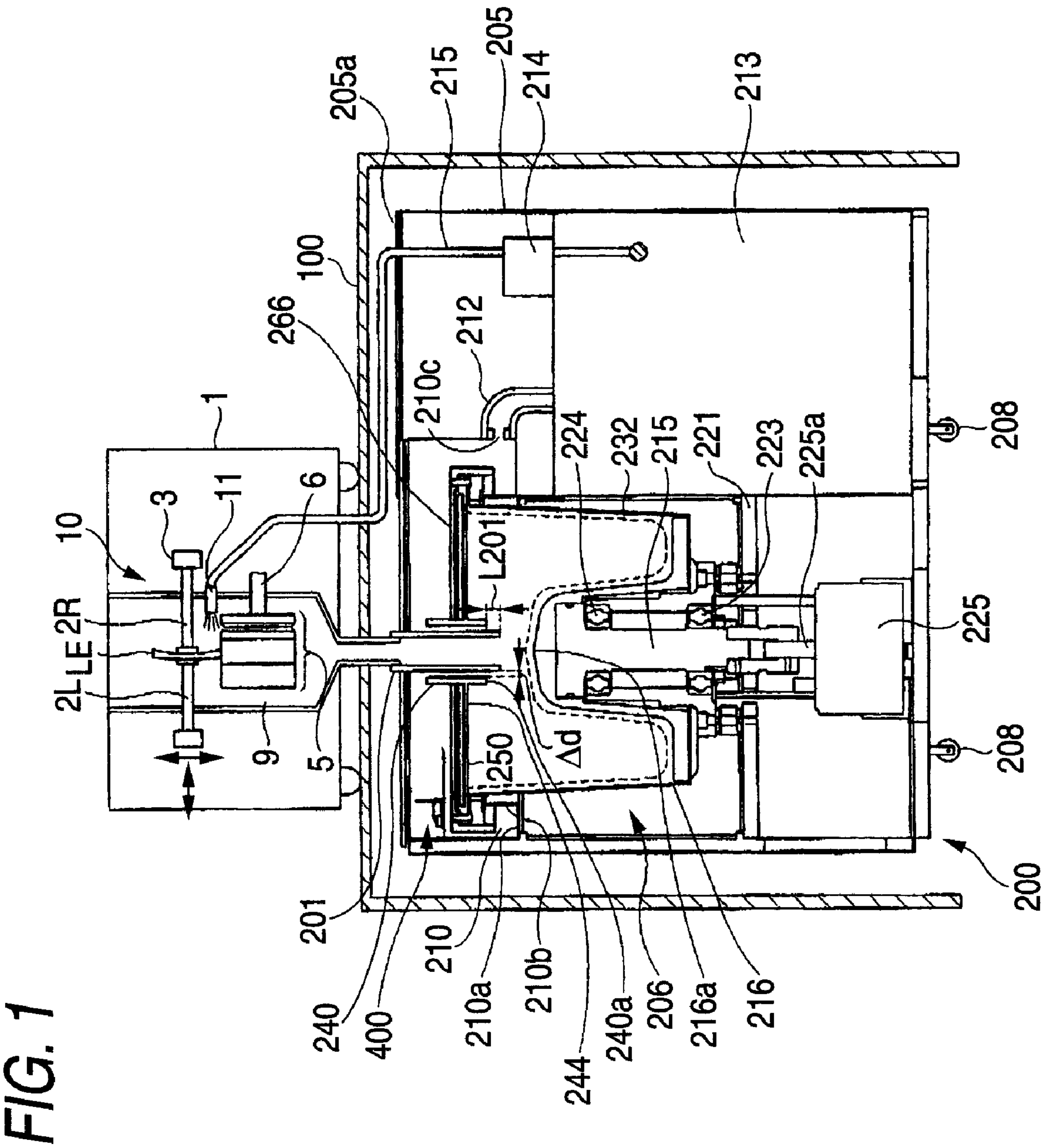
FIG. 1 is a view showing a whole eyeglass lens processing apparatus.

FIG. 1 is a view showing an outline constitution of a whole eyeglass lens processing apparatus according to the invention. The eyeglass lens processing apparatus includes a processing apparatus main body 1, a table 100 for mounting the main body 1, and a grinding water treating apparatus 200. Further, in FIG. 1 the main body 1 is drawn by being contracted relative to the apparatus 200 for convenience of an explanation.

Inside of the main body 1 is arranged with a processing mechanism portion 10 including two lens chuck shafts (lens rotating shaft) 2R and 2L holding a processed lens LE, a carriage portion 3 rotatably attached with the chuck shafts 2R and 2L, a grindstone 5 attached to a spindle (rotating shaft) 6 and the like. The carriage portion 3 is constituted lovably in the direction of the chuck shafts 2R and 2L and movably relative to the grindstone 5. Further, with regard to the mechanism portion 10, a constitution of JP-A-H05-212661 by the applicant can be used, and therefore, a detailed explanation thereof will be omitted.

In processing an eyeglass, grinding water is sprayed to the lens LE and the grindstone 5 from a nozzle 11. Further, the grinding portion of the grindstone 5 is cooled. And a processing refuse is washed to flow to a bottom portion of a processing chamber 9. A drain pipe 201 is connected to a bottom portion of the processing chamber 9. Therefore, the grinding water including the processing refuse is discharged from the bottom portion of the processing chamber 9.

A lower side of the table 100 is provided with the grinding water treating apparatus 200. The apparatus 200 includes a cabinet 205. Further, inside of the cabinet 205 is arranged with a centrifugal separator 206 and a tank 213 for storing the grinding water. The drain pipe 201 is disposed at a center of rotation of the centrifugal separator 206 and is fixed to a ceiling plate 205*a* of the cabinet 205. Movement of the grinding water treating apparatus 200 is facilitated by a castor 208 for moving provided on a bottom surface side of the cabinet 205.

Further, the apparatus 200 includes a grinding water collecting case 210 fixed to the cabinet 205. The case 210 includes a bottom wall 210*a*. Further, a center portion of the bottom wall 210*a* is formed with an inner cylinder portion 210*b* projected to an upper side. Further, a periphery portion of the bottom wall 210*a* is formed with a connecting hole 210*c*.

The centrifugal separator 206 includes a rotating shaft 215 and a dewatering tank 216 fixedly attached to the rotating shaft 215. A bottom portion 216*a* of the dewatering tank 216 is constructed by a constitution in which a center portion thereof is higher than a peripheral portion thereof. By the constitution, in comparison with the case in which the height of the bottom portion is uniform, a height of a gravitational center of the dewatering tank 216 becomes high. Thereby, a stability of the dewatering tank 216 in being rotated is promoted.

Further, the centrifugal separator 206 includes a partitioning plate 221 attached to a lower side of the cabinet 205, bearings 223 and 224 for rotatably holding the rotating shaft 215 relative to the cabinet 205 and the partitioning plate 221, and a drive motor 225 attached to the partitioning plate 221. An output shaft 225*a* of the motor 225 is attached with the rotating shaft 215. Therefore, the dewatering tank 216 is rotated by being driven by the motor 225.

An upper portion of the dewatering tank 216 is arranged with a filter 250 in a ring-like shape and a planar shape for separating to filter the processing refuse from drain water. Further, inside of the dewatering tank 216 is mounted with a bag 232 of vinyl or the like for facilitating to take out the processing refuse.

An essential portion of the vicinity of the filter 250 will be explained in reference to FIG. 2. First, the dewatering tank 216 is covered with the bag 232 for storing the processing refuse. According to the embodiment, when the processing refuse is thrown away, the processing refuse is thrown away along with the bag 232, and therefore, a general bag made of vinyl is used. Further, a ring-like member 290 of an upper portion of the dewatering tank 216 is planted with 6 pieces of pins 236 at equal intervals. The bag 232 is opened with holes 238 in correspondence with the pins 236. Further, by corresponding the holes 238 to respectives of the pins 236, positioning of the bag 232 relative to the dewatering tank 216 can easily be carried out.

Further, an upper side of the bag 232 is covered with a cylindrical member 240 surrounding the drainpipe 201, a circular disk-like member 244 including a number of holes (according to the embodiment, a diameter thereof is 3 mm) 242. Further, an outer diameter d244 of the member 244 is larger than an inner diameter d2801 of a first ring-like member 280 at an upper portion of the dewatering tank 216. Furthermore, the outer diameter d244 is constituted to be slightly smaller than an inner diameter d 2901 of a second ring-like member 290 disposed above the first ring-like member 280.

An upper side of a holding portion 256 is mounted with the filter 250 having a shape substantially the same as that of the disk-like member 244. The filter 250 collects the processing refuse of the grinding water and separates water to the upper portion. According to the embodiment, a nonwoven cloth is used for the filter 250. The filter 250 having a function of filtering about 10 μm is used. Furthermore, the filter 250 is provided with an opening 250*a* at a center thereof. The cylindrical member 240 is inserted to the opening 250*a*. Further, the drain pipe 201 is inserted into the member 240. When the member 240 is not used, a size of the opening 250*a* is ensured with a small gap (3 through 5 mm) when the opening 250*a* is inserted with the drain pipe 201.

The cylindrical member 240 is provided with a lower end 240*a* (refer to FIG. 1, FIG. 5 and FIG. 6) projected to a lower side from the filter 250. According to the embodiment, a length L256 to the lower end 240*a* of the cylindrical member 240 from the disk-like member 244 disposed below the filter 25 is set to 15 mm (refer to FIG. 5 and FIG. 6). The cylindrical member 240 having the length L256 constitutes a wall for collecting the grinding water pressed up to the upper side by the rotation of the dewatering tank 216 to the filter 250 as much as possible.

An upper side of the filter 250 is covered with a second filter holding portion 266. The holding portion 266 includes a number of holes (according to the embodiment, a diameter thereof is 3 mm) 262, and provided with a shape substantially the same as the filter 250 (or, the circular disk-like member 244).

An upper side of the holding portion 266 is covered with a ring-like lid 270 for pressing the bag 232, the first filter holding portion 256, the filter 250 and the second filter holding portion 266 to the dewatering tank 216.

Figure 3A:
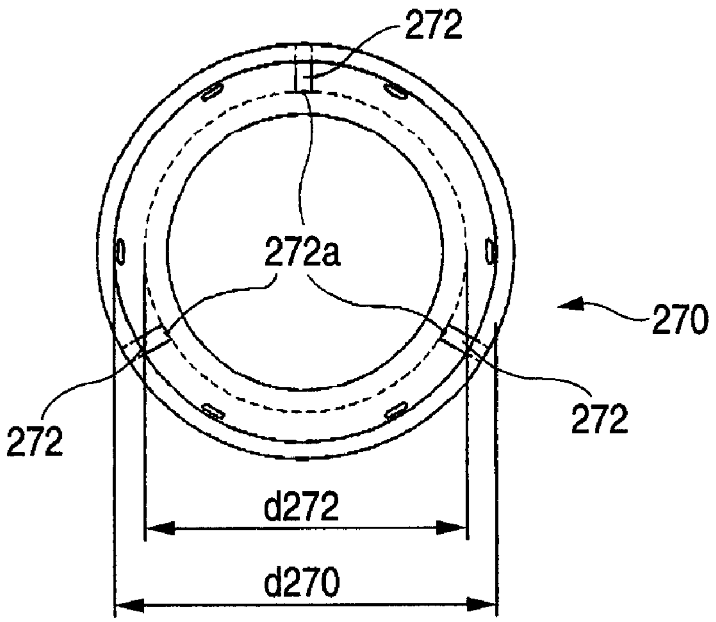
FIG. 3A through FIG. 3B are views for explaining fitting of a ring-like lid.
Figure 3B:
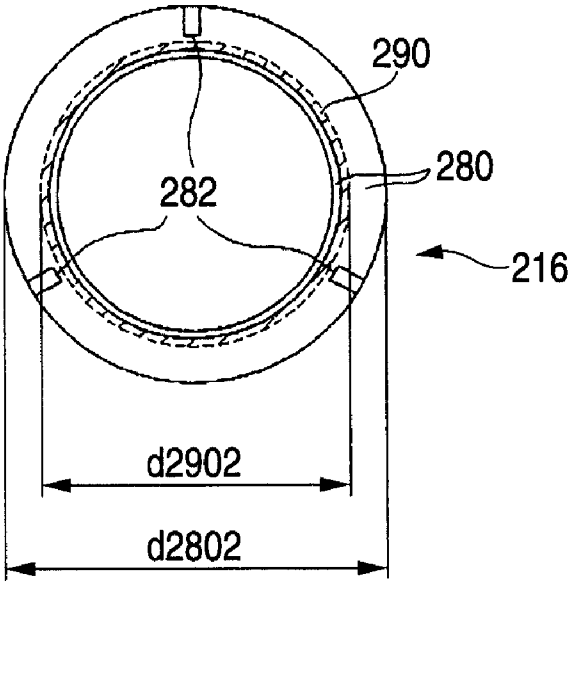

FIG. 3A shows a view viewing the ring-like lid 270 from a lower side. Further, FIG. 3B shows an essential portion in viewing the dewatering tank 216 from an upper side. Further, both FIG. 3A and FIG. 3B illustrate an essential portion related to the explanation to be large for convenience of explanation. An upper portion of the dewatering tank 216 is fixedly attached with a first ring-like member 280. An upper side of the member 280 is fixedly attached with a second ring-like member 290 having an outer diameter d2902 smaller than an outer diameter d2802 of the member 280.

An inner diameter d270 of the ring-like lid 270 is slightly larger than the outer diameter d2802 of the first ring-like member 280. Further, the ring-like lid 270 is mounted with 3 pieces of pins 272 at equal intervals from an outer periphery to an inner side. Here, an inner diameter of a circle brought into contact with an inner side 272*a* of the pin 272 and concentric with the inner diameter d270 (hereinafter, pin inner diameter) is designated by notation d272. The pin inner diameter d272 is slightly larger than the outer diameter d2902 and smaller than the outer diameter d2802.

Further, the first ring-like member 280 is provided with 3 pin grooves 282 at equal intervals. The pin groove 282 corresponds to the pin 272 of the ring-like lid 270. First, an operator sets the bag 232 through the second filter holding portion 266 to the dewatering tank 216. Successively, the operator attaches the ring-like lid 270 to the dewatering tank 216 such that the pins 272 respectively correspond to the pin grooves 282.

Figure 2:
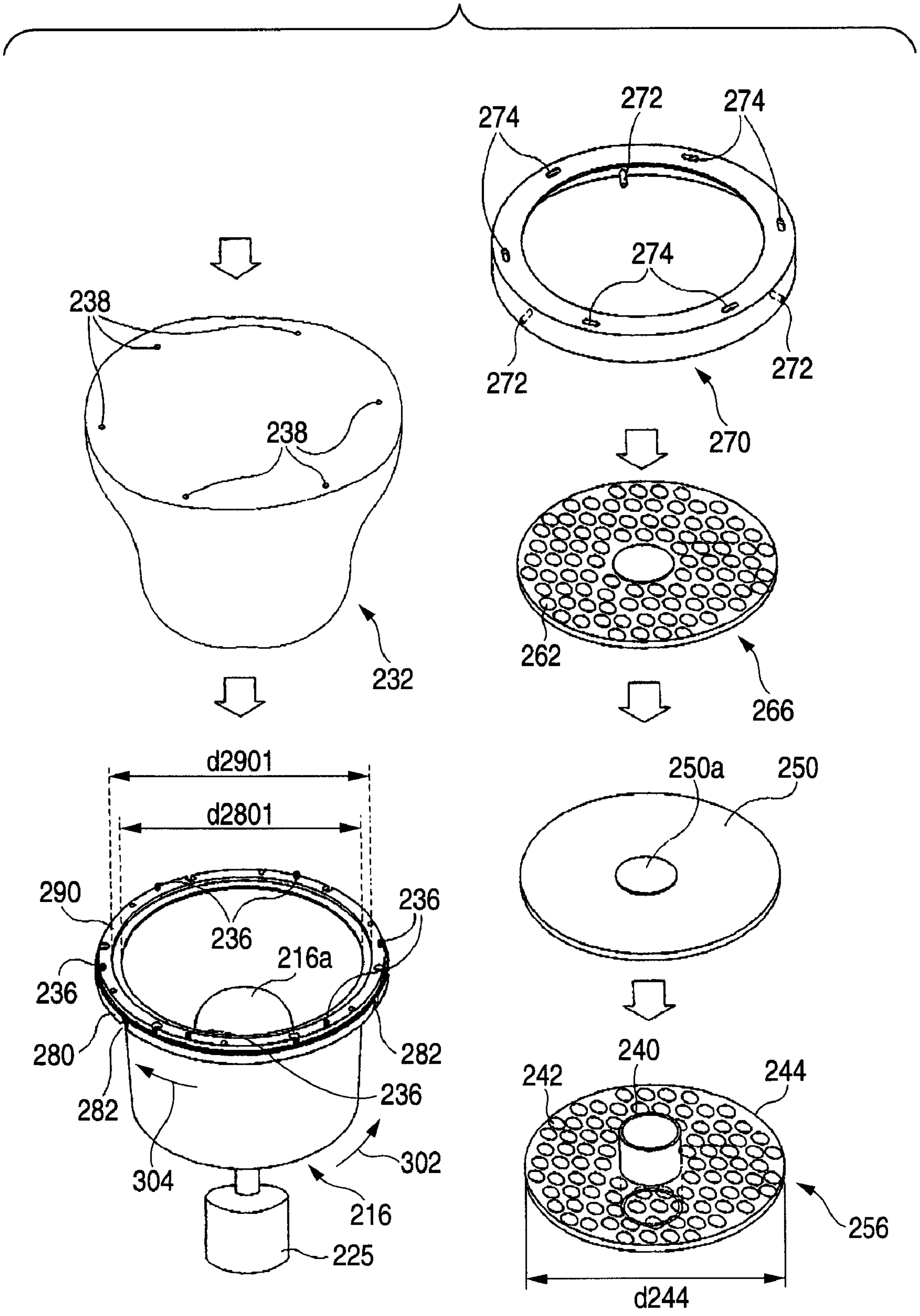
FIG. 2 is a view for explaining an essential portion at a vicinity of a filter.

In FIG. 2, the dewatering tank 216 dewaters the grinding water by being rotated in a direction of an arrow mark 302. In accordance with rotating the dewatering tank 216 in the direction of the arrow mark 302, the pin 272 is guided in a direction of an arrow mark 304 (direction reverse to the arrow mark 304) in accordance with the law of action and reaction. The pin groove 292 is formed such that the more directed to the lower side, the more inclined in the direction of the arrow mark 304. Therefore, there is constructed a constitution in which the ring-like lid 270 is not detached while rotating the dewatering tank 216 without retaining the ring-like lid 270 to the dewatering tank 216 by a screw or the like.

Further, the ring-like lid 270 is provided with long holes 274 substantially in a circular arc shape for corresponding to the pins 236 at 6 portions at equal intervals. The operator can confirm a degree of fitting the ring-like lid 270 by viewing a positional relationship between an upper portion of the pin 236 and the long hole 274.

By assembling as shown by FIG. 2, the bag 232 and the filter 250 are easily attached to the dewatering tank 216. FIG. 1 shows a state of assembling up to the second filter holding portion 266. A lower side opening of the drain pipe 201 is disposed on the lower side of the lower side opening (lower end 240*a*) of the cylindrical member 240 by the length L201. The length L201 is, for example, 10 mm. Details of the operation will be described later. Further, a difference between the inner diameter of the cylindrical member 240 and the outer diameter of the drain pipe 201 (hereinafter, gap) Δd is about 5 mm and details thereof will be described later.

Figure 4:
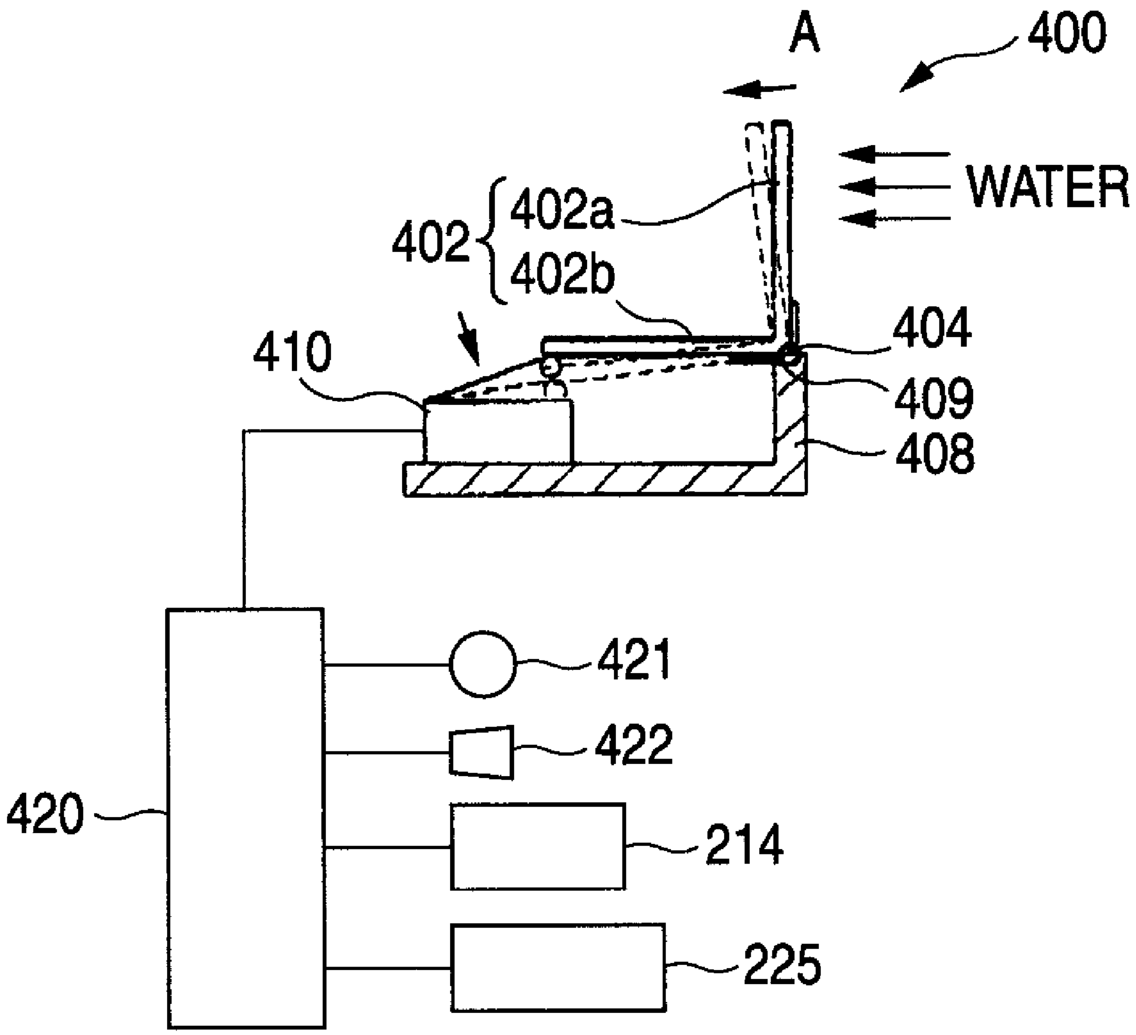
FIG. 4 is an outline constitution view of a processing refuse amount detecting mechanism.

In FIG. 1, the grinding water collecting case 210 is arranged with a processing refuse amount detecting mechanism 400. The detecting mechanism 400 is arranged at a position on an upper side of the centrifugal separator 206 and at a vicinity of the ceiling plate 205*a* of the cabinet 205. FIG. 4 is an outline constitution view of the detecting mechanism 400. A plate 402 in an inverse L-like shape is constituted by a first plate 402*a* extended in a vertical direction and a second plate 402*b* extended in a horizontal direction. Further, the plate 402 is supported by a support member 408 rotatably in an arrow mark A direction centering on a shaft 404. The plate 402 is maintained in a state of FIG. 4 by a spring 409 attached around the shaft 404 when the plate 402 is not exerted with a constant force or more (hydraulic pressure) from outside. An end portion of the second plate 402*b* is brought into contact with a microswitch 410.

In accordance with storing a large amount of the processing refuse at inside of the dewatering tank 216, the grinding water is powerfully sprung out from the dewatering tank 216. Then, the grinding water impinges on the first plate 402*a*. When the first plate 402*a* is exerted with the constant force or more, the plate 402 is rotated in the arrow mark A direction centering on the shaft 404. Further, the microswitch 410 is pressed down by the end portion of the second plate 402*b*. Thereby, a switch signal of the microswitch 410 is outputted to a control portion 420. The control portion 420 receives a detecting signal from the microswitch 410. Further, the control portion 420 turns on a display lamp 421 as informing means and emits alarm sound by a buzzer 422 in order to inform the operator that a large amount of the processing refuse is stored to the dewatering tank and it is necessary to take out the processing refuse.

Further, the grinding water collected by the grinding water collecting case 210 is stored at the tank 213 by way of a hose 212 connected to the connecting hole 210*c*. The grinding water stored to the tank 213 is sucked by a suction pump 214 and is supplied to the side of the processing apparatus main body 1 by way of the a suction pipe 215. The connecting hole 210*c* is constituted to be disposed to be higher than a floor surface. Thereby, when the grinding water collected by the grinding water collecting case 210 is discharged (not used again as grinding water), there is achieved an advantage of saving time and labor of using a pump or the like until reaching a drain port (not illustrated) (that is, the grinding water flows to the drain port by being dropped naturally).

Next, operation of the grinding water treating apparatus 200 will be explained. When the lens LE is started to be processed by the main body 1, the suction pump 214 is driven by the control portion 420. Next, the grinding water sucked from the side of the tank 213 is injected from the nozzle 11. The injected grinding water and the processing refuse produced in processing are guided to a side of the dewatering tank 216 by way of the drain pipe 201. Further, simultaneously with starting to process the periphery of the lens LE, the motor 225 is driven by the control portion 420 and the dewatering tank 215 is rotated integrally therewith.

The grinding water brought to the dewatering tank 216 is moved in a radius direction at inside of the dewatering tank 216 along with the processing refuse by receiving a centrifugal force generated due to the rotation of the dewatering tank 216. A specific weight of the processing refuse is larger than that of water, and therefore, the processing refuse is pressed to and deposited on a side of an inner wall of the dewatering tank 216 by the centrifugal force. On the other hand, water of the grinding water is pressed up to an upper side by the centrifugal force. Further, the water is made to pass the hole 242 of the first filter holding portion 256. On the other hand, only the processing refuse is separated to a lower side by the filter 250. Further, the water is made to pass further the hole 262 of the second filter holding portion 266, thereafter, collected by the grinding water collecting case 210. The grinding water passing through the filter 250 is brought into a fine misty state.

Figure 5:
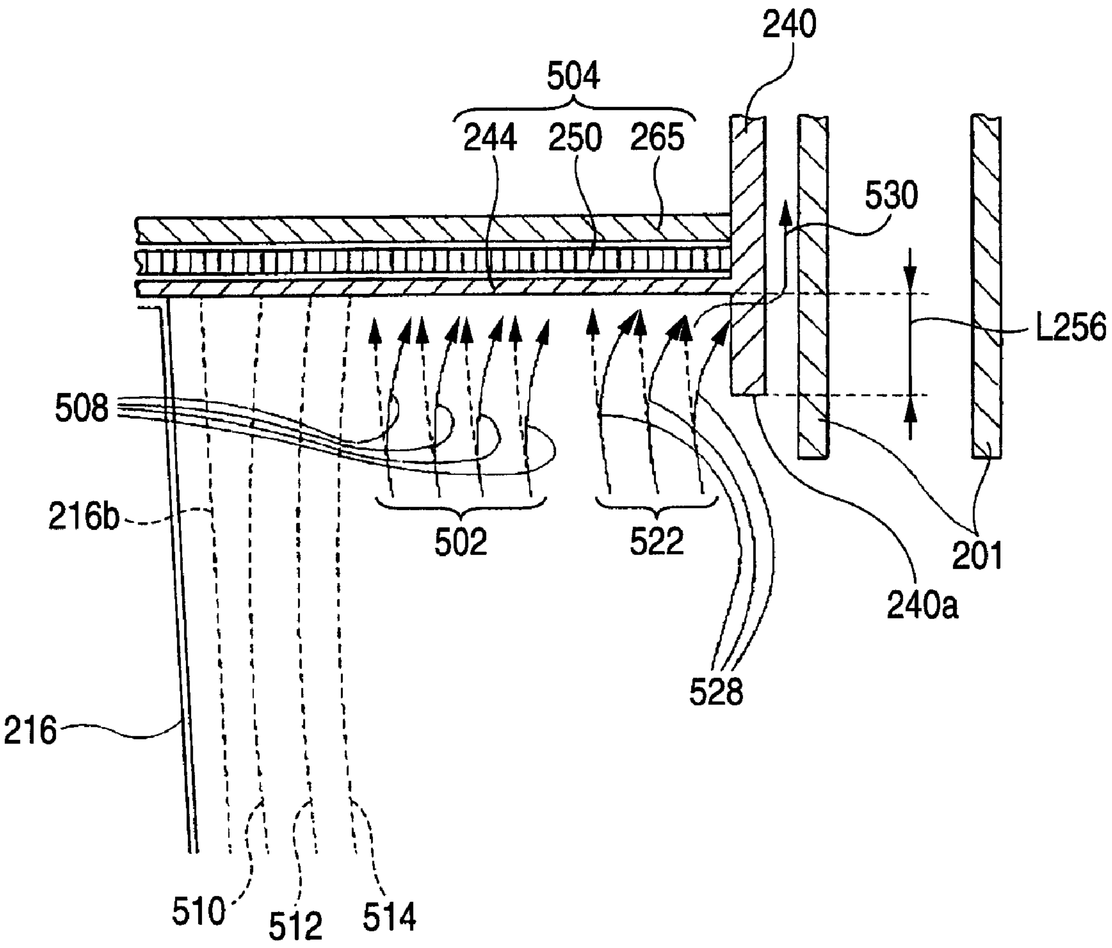
FIG. 5 is a view for explaining an essential portion at a vicinity of the filter and a cylindrical member.

An explanation will be given of an operation of separating the grinding water and the processing refuse by the cylindrical member 240 in reference to FIG. 5. FIG. 5 is a view enlarging vicinities of the filter 250 and the cylindrical member 240. By rotating the dewatering tank 216, the grinding water at inside of the dewatering tank 216 is made to move forward in an upper direction on a locus such as a portion of a parabola as shown by an arrow mark 502. At this occasion, the grinding water moves forward substantially in an extended direction of the arrow mark 502 when there is not present a constituent element (hereinafter, flow path resistance) 504 constituting a resistance at a flow path of the grinding water of the filter 250, the second filter holding portion 266 or the like. However, actually, a flow of a portion of the grinding water is bent to an inner side of the dewatering tank 216 as shown by an arrow mark 508 owing to an influence of the flow path resistance 504.

When a number of the lenses are processed, the processing refuse collected by the filter 250 is increased. A particle of the processing refuse is directed to an inner side from a side wall 216*b* of the dewatering tank 216 to be deposited in an order of dotted lines 510, 512, 514.

Further, with an increase in a deposit amount of the processing refuse, an amount of bending the flow path of a portion of the grinding water is increased. For example, when the grinding water is moved forward on a locus as shown by an arrow mark 522, owing to the influence of the flow path resistance 504, as shown by an arrow mark 528, the grinding water is considerably bent to the inner side of the dewatering tank 216 (more considerably than in the case of the arrow mark 508).

Hence, according to the apparatus of the embodiment, the lower end 240*a* of the cylindrical member 240 is disposed below the circular disk-like member 244 disposed below the filter 250 by the length L256 (15 mm ). An explanation will be given of a case in which the lower end 240*a* having the length L256 is not formed, that is, a case in which there is not a distance to the lower side of the cylindrical member relative to the circular disk-like member 244 (including a case in which the distance is extremely short). In this case, the resistance of the flow path is not present on the inner side of the circular disk-like member 244, and therefore, the grinding water moving forward on the flow path of the arrow mark 528 is made to be liable to move forward in an arrow mark 530. Then, the grinding water in a state of including a large amount of the processing refuse (that is, the processing refuse is not separated by passing the filter 250) is sprung out from the centrifugal separator 206 and is collected by the grinding water collecting case 210.

The cylindrical member 240 having the length L256 is provided in contrast thereto. Thereby, even when a large amount of the processing refuse is stored, the grinding water brought into a state of not separating the processing refuse is restrained from being sprung out from the centrifugal separator 206 and is made to pass the filter 250 as much as possible. Thereby, an efficiency of filtering the processing refuse and the grinding water can be promoted.

Figure 6A:
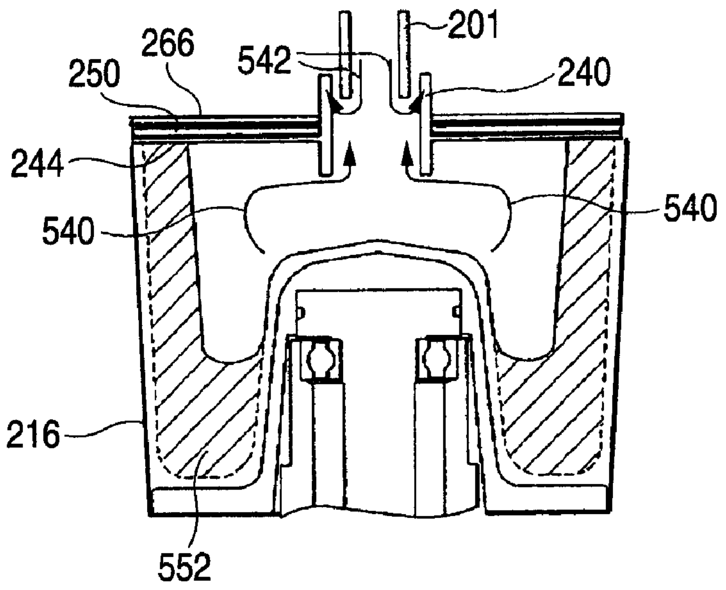
FIG. 6A through FIG. 6B are views for explaining a positional relationship between a drain pipe and the cylindrical member.

Next, a positional relationship between the cylindrical member 240 and an opening of a lower side of the drain pipe 201 will be explained in reference to FIGS. 6A and 6B. By rotating the dewatering tank 216, a strong air flow is generated at inside of the dewatering tank 216. When a large amount of the processing refuse 552 is stored at inside of the dewatering tank 216, the air flow at inside of the dewatering tank 216 cannot pass the filter 250. Further, an air flow (arrow mark 540) moving forward to an upper side from a gap between the cylindrical member 240 and the drain pipe 201 is increased. As shown by FIG. 6A, when the opening on the lower side of the drain pipe 201 is disposed above the lower end of the cylindrical member 240, drain water dropping from the drain pipe 201 is lifted by the air flow of the arrow mark 540. Further, as shown by an arrow ark 542, the grinding water in the state of including the processing refuse is made to be liable to spring out to an upper portion from the gap between the cylindrical member 240 and the drain pipe 201. In this case, the efficiency of filtering the processing refuse is deteriorated.

Figure 6B:
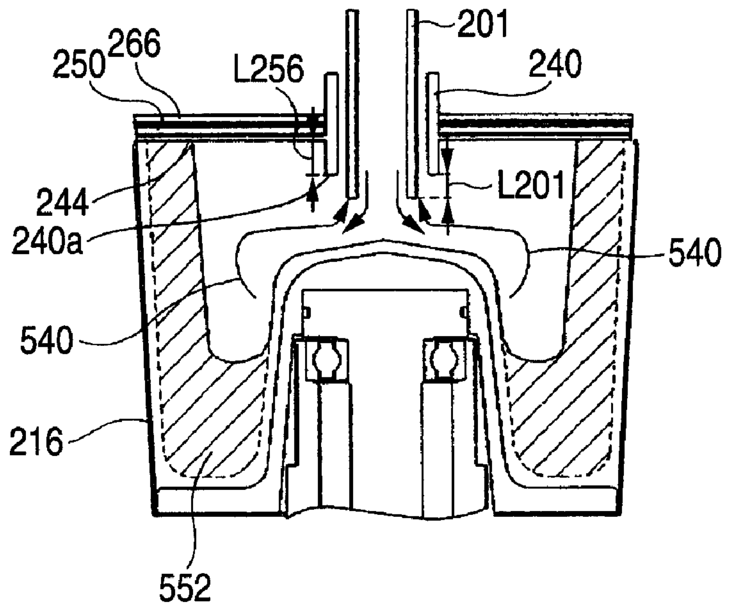

In contrast thereto, an explanation will be given of a case of making the opening of the lower side of the drain pipe 201 disposed below the lower end of the cylindrical member 240 as shown by FIG. 6B. In this case, even when the drain water dropping from the drain pipe 201 is lifted by the air flow or the arrow mark 540, a rate of draining the drain water to the upper side from the gap between the cylindrical member 240 and the drain pipe 201 is reduced. Thereby, an amount of the grinding water moved around to the side of the filter 250 is increased and the filtering efficiency is promoted. It is preferable to ensure the position (the length L201) of the opening on the lower side of the drain pipe 201 relative to the cylindrical member 240 by 10 mm or larger.

Figure 7:
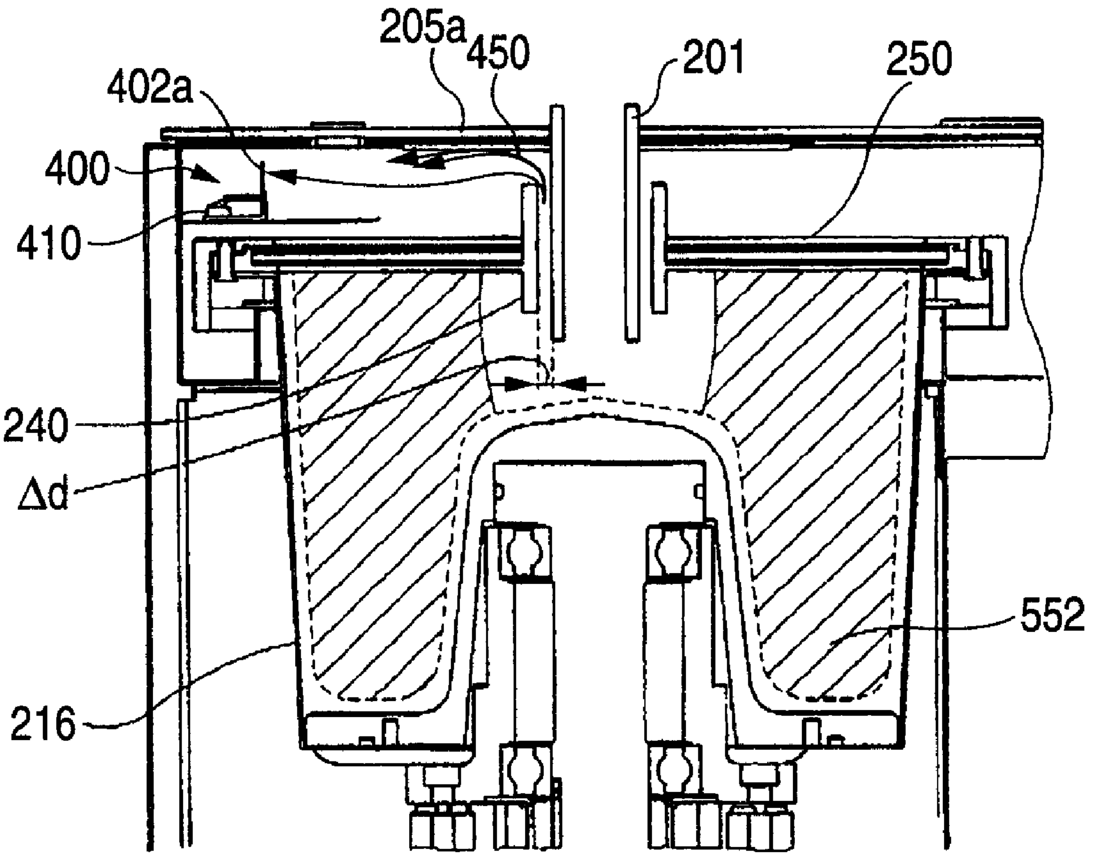
FIG. 7 is a view for explaining operation of the processing refuse amount detecting mechanism.

Next, an explanation will be given of an operation of the processing refuse amount detecting mechanism 400 for detecting that a large amount of the processing refuse is stored at the dewatering tank 216. FIG. 7 shows a state of depositing a large amount of the processing refuse 552 at inside of the dewatering tank 216. Under the state, a region of the filter 250 which can be used for separating the processing refuse is extremely narrowed. According to the embodiment, the filter 250 and the like are rotated along with the dewatering tank 216, and therefore, a gap Δd of about 5 mm is provided between the cylindrical member 240 and the drain pipe 201.

When deposition of the processing refuse is small, the grinding water passes the filter 250. That is, the grinding water is dispersed in a misty-like state by a fine fiber structure of the nonwoven cloth of the filter 250. Therefore, there is hardly the grinding water passing an interval of the gap Δd. When the grinding water passes the filter 250 to be dispersed in the misty-like state, even in a case of impinging on the plate 402, the pressure of the grinding water dispersed it the misty-like state is small. Therefore, the plate 402 is not rotated to the side of the microswitch 410. However, when a large amount of the processing refuse is stored at inside of the dewatering tank 216 as shown by FIG. 7, the grinding water capable of passing the filter 250 is reduced and an amount thereof sprung out while passing the interval of the gap Δd is rapidly increased. In this case, the grinding water is liable to be sprung out as a block of water from the gap Δd. The water sprung out from the gap Δd impinges on the ceiling plate 205*a*. And the water is sprung out to the side of the processing refuse amount detecting mechanism 400 powerfully as shown by an arrow mark 450. When the block of the grinding water impinges on the plate 402 powerfully, the plate 402 is rotated to the side of the microswitch 410 by the pressure. When the microswitch 410 is pressed, by the display lamp 421 and the buzzer 422, the operator is informed that there is brought about a timing of being necessary for taking out the processing refuse stored at inside of the dewatering tank 216.

Thereby, before a capacity of treating the processing refuse by the centrifugal separator 206 reaches a limit, the operator is informed of a timing of necessitating to take out the processing refuse and can pertinently treat the processing refuse.

Further, a position of arranging the plate 402 of the processing refuse amount detecting mechanism 400 is not limited to a position of the embodiment. The plate 402 may be arranged at a position of receiving the grinding water sprung out from the gap Δd between the cylindrical member 240 and the drain pipe 201 (that is, the opening 250*a* of the filter 250). Further, also a constitution of the detecting mechanism 400 is not limited to the illustrated. The mechanism may be that of detecting a change in the pressure of the grinding water sprung out from the opening (gap Δd) of the filter 250.

When the large amount of the processing refuse is stored at the dewatering tank 216, the operator takes out the processing refuse. At this occasion, as has explained in reference to FIG. 2, the ring-like lid 270 can be detached simply without a tool. The operator can take out the bag 232 stored with the processing refuse further easily. A dewatering effect is promoted by the filter 250 provided at the upper portion of the centrifugal separator 206, and an amount of the grinding water remaining at inside of the bag 232 is reduced. Therefore, the processing refuse is made to be able to be thrown away to treat as it is. Further, the bag 232 as a whole can be treated to throw away, and therefore, the operator can easily carry out the treating operation and become rarely dirty.

Second Embodiment

Figure 8:
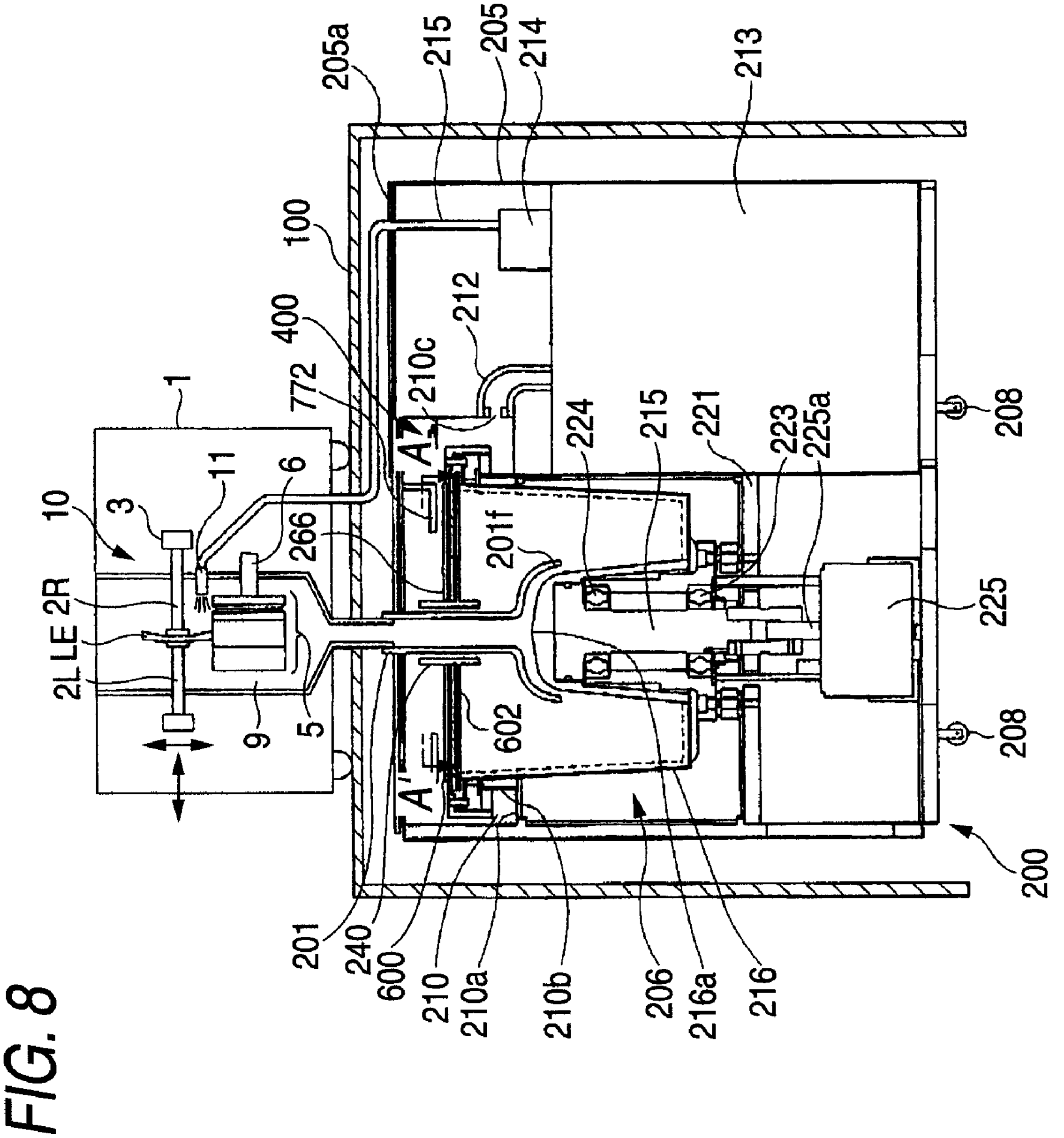
FIG. 8 is a whole outline constitution view of a second embodiment.
Figure 9:
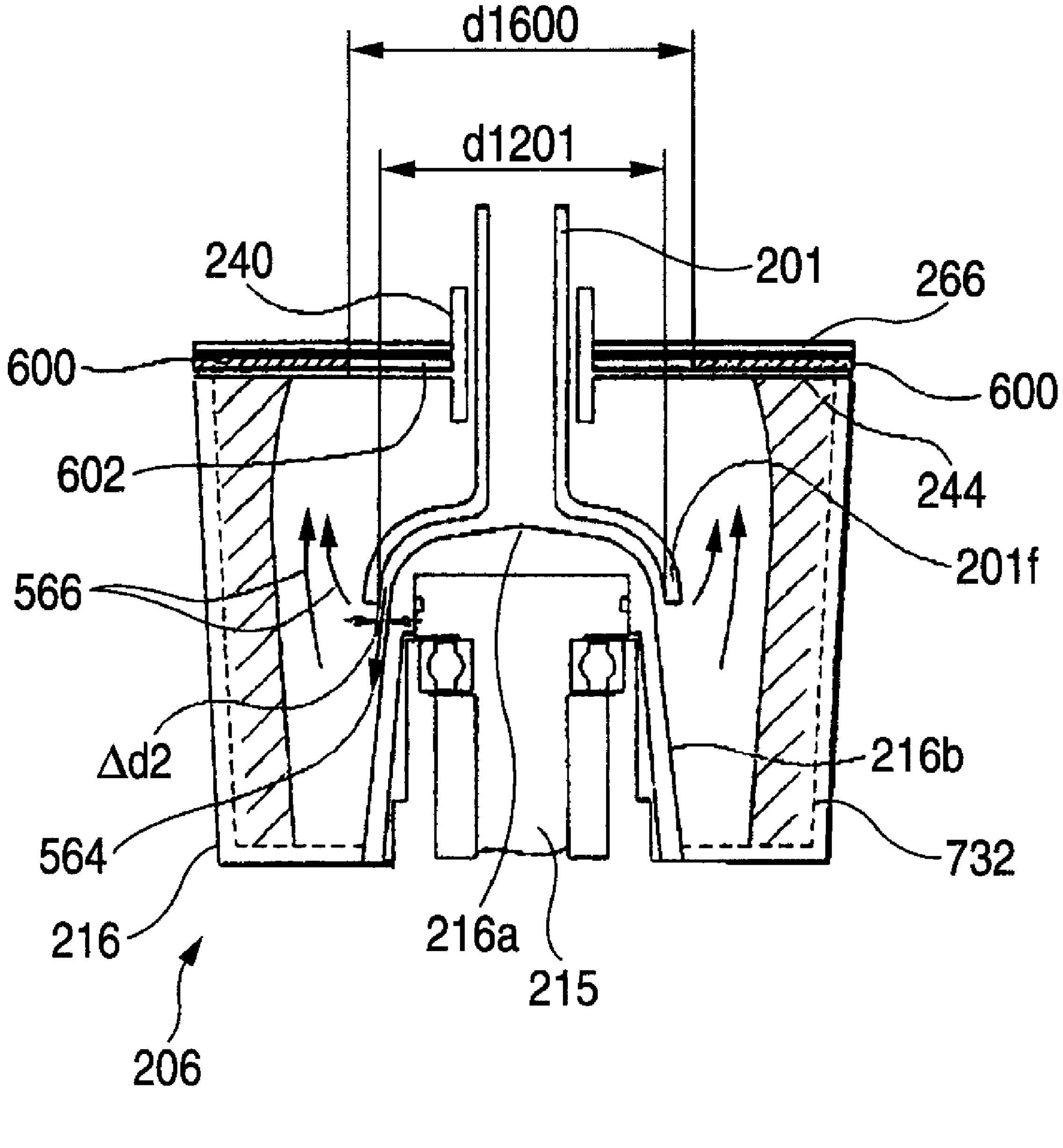
FIG. 9 is a view enlarging an essential portion of a centrifugal separator.

A second embodiment will be explained with reference to FIG. 8 through FIG. 13. FIG. 8 is an outline constitution view of a whole grinding water treating apparatus according to the second embodiment. Constituent elements the same as those shown in FIG. 1 of the first embodiment are attached with the same notations and an explanation thereof will be omitted. FIG. 9 is a view enlarging an essential portion of the centrifugal separator 206 provided to the grinding water treating apparatus.

In FIG. 9, the rotating shaft 215 arranged at the center of the dewatering tank 216 is extended up to about a half of a height of the dewatering tank 216. Further, the rotating shaft upper surface 216*a* formed above the rotating shaft 215 is formed at a position higher than the half of the height of the dewatering tank 216. Further, diameters of the rotating shaft 215 and the side portion surface 216*b* formed therearound are formed to be equal to or larger than ⅓ of the diameter of the dewatering tank 216. Thereby, even when the large amounts of the grinding water and the processing refuse are stored at inside of the dewatering tank 216, the stability of rotating the dewatering tank 216 is ensured. The constitution is similar to that of the dewatering tank 216 of FIG. 1.

The lower end of the drain pipe 201 arranged above the rotating shaft upper surface 216*a* is formed with an introducing guide 201*f* extended to a position lower than the rotating shaft upper portion surface 216*a*. Further, the introducing guide 201*f* may be formed integrally with the drain pipe 201. Or the introducing guide 201*f* may be attached thereto as a separate part. A gap Δd2 for sufficiently introducing the grinding water cast from above is ensured between the introducing guide 201*f* and the rotating shaft upper surface 216*a* (side portion surface 216*b*).

An upper portion of the dewatering tank 216 is arranged with the first filter holding portion 256 including the cylindrical member 240 surrounding the drain pipe 201, and the circular disk-like member 244 having a number of the holes 242 similar to the first embodiment. A filter 600 (illustrated by netting in FIG. 8) in a ring-like shape having an outer diameter substantially the same as the disk-like member 244 is mounted on the circular disk-like member 244. Furthermore, an upper side of the filter 600 is mounted with the second filter holding portion 266 of a shape the same as that of the circular disk-like member 244 having a number of holes (diameter thereof is 3 mm).

The filter 600 is for collecting the processing refuse from the used grinding water at a lower portion thereof and separating water to an upper portion thereof. The filter 600 is formed by a material the same as that of the filter 250 of the preceding example. Meanwhile, the ring opening 250*a* of the filter 250 has been constituted by a size of passing the cylindrical member 240. In contrast thereto, according to the filter 600, an opening 602 for passing water which has not been filtered thereby is formed to be larger than an outer shape of the cylindrical member 240. According to the embodiment, an opening diameter of the introducing guide 201*f* is designated by notation d1201 and an inner diameter of the filter 600 is designated by notation d1600. Further, the inner diameter d1600 is taken to be slightly larger than the opening diameter d1201. When the inner diameter d1600 is excessively smaller than the opening diameter d1201, an amount of springing out the centrifugally-separated water is reduced and a dewatering efficiency is deteriorated.

Further, according to the second embodiment, the gap between the drain pipe 201 and the cylindrical member 240 functions mainly as a gap not for springing out water by centrifugal separation but for making rotation smooth Operation of the centrifugal separator 206 having such a constitution will be explained. The grinding water (drain water) including the processing refuse introduced by passing the drain pipe 201 is guided by the introducing guide 201*f* at the lower end of the drain pipe 201 to flow down to the lower side. Here, an explanation will be given of a case in which the introducing guide 201*f* is not present. In this case, when the large amount of the grinding water flows down powerfully from the drain pipe 201, the grinding water impinges on the rotating shaft upper portion surface 216*a* to be sprung back and is sprung in a lateral direction and upper direction of the dewatering tank 216. When a large amount of the processing refuse is stored at inside of the dewatering tank 216, the grinding water including the processing refuse sprung back from the rotating shaft upper portion surface 216*a* in the lateral direction and the upper direction is made to be easy to be sprung directly to outside of the dewatering tank 216 by passing the opening 602 of the filter 600.

In contrast thereto, an explanation will be given of the centrifugal separator 206 provided with the introducing guide 201*f* as shown by FIG. 9. In this case, the grinding water guided by the introducing guide 201*f* is guided to the lower side of the rotating shaft upper surface 216*a* by following a flow path of an arrow mark 564 by passing the gap Δd2. Thereby, a large portion of the grinding water is centrifugally separated at inside of the dewatering tank 216 and in a direction of an outer periphery of the opening d1201. Further, the grinding water passes the filter 600 by following a flow path indicated by an arrow mark 566 to facilitate to separate the processing refuse.

Figure 10:
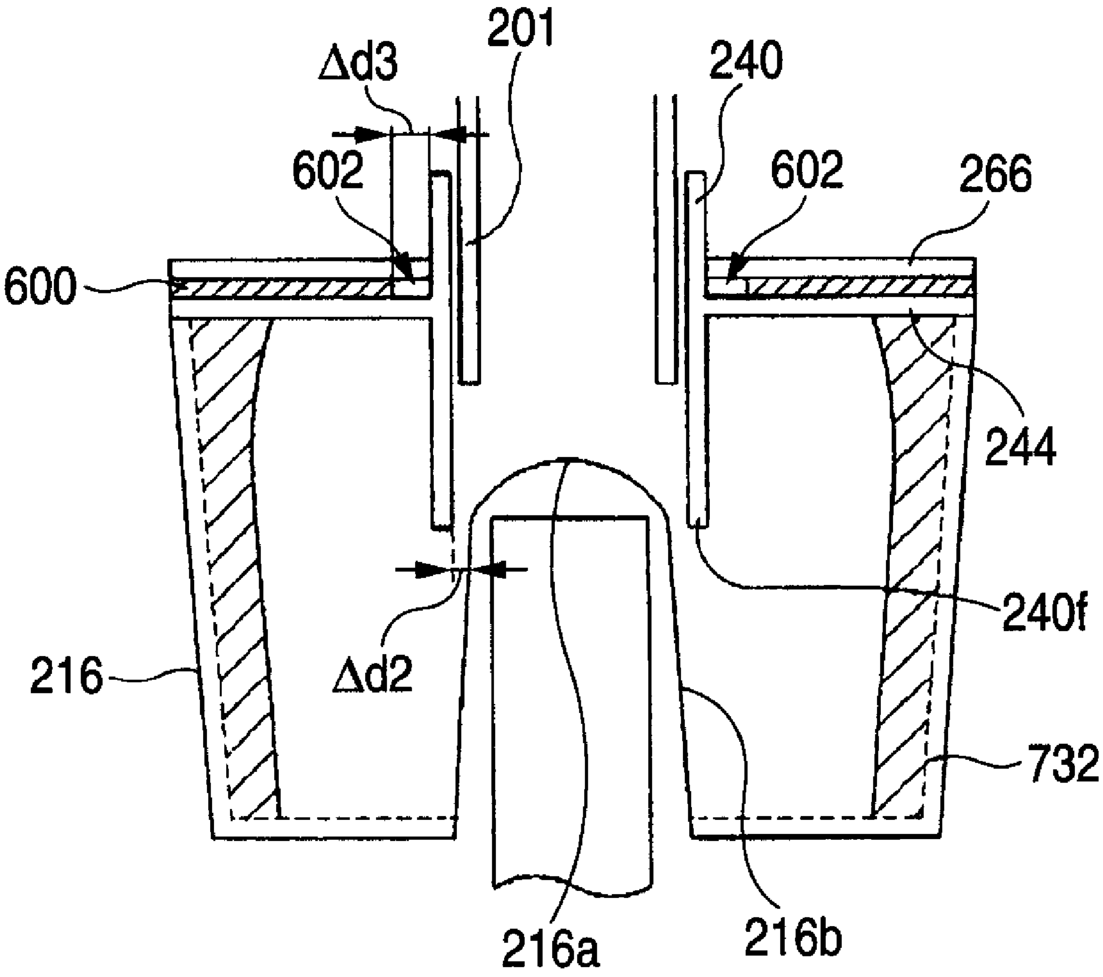
FIG. 10 is a view enlarging an essential portion of other centrifugal separator.

Further, in FIG. 9, the introducing guide 201*f* is constituted by a shape of being extended from the drain pipe 201. However, the shape is not limited thereto. FIG. 10 shows a case in which the diameter of the drain pipe 201 in slenderer than the upper surface 216*a* of the dewatering tank 216. This is an example of extending the lower end of the cylindrical member 240 straight to a position lower than the rotating shaft upper portion surface 216*a* to constitute an introducing guide 240*f*.

Also in this example, the gap Δd2 capable of sufficiently guiding the grinding water cast from above is ensured between the introducing guide 240*f* and the rotating shaft upper portion surface 216*a* (side portion surface 216*b*) such that the grinding water is guided from the rotating shaft upper portion surface 216*a* by following the side surface portion 216*b*. Further, the inner diameter (opening diameter) of the filter 600 is made to be larger than the outer shape of the cylindrical member 240 constituting the introducing guide 240*f* similar to the case of FIG. 9 to form a gap Δd3 for passing water which has not been filtered by the filter 600. Although the gap Δd3 is, for example, about 5 mm, the gap is not limited thereto. It is preferable that the gap Δd3 is constituted by a dimension of sufficiently discharging the water at inside of the dewatering tank 216 (that is, the gap Δd3 is formed by a size by which an amount of the grinding water including the processing refuse exceeds an amount of drain water introduced from the drainpipe 201 when the grinding water cannot be filtered by passing the filter 600), and capable of holding the processing refuse as much as possible. Further, also the same goes with a gap Δd formed between the cylindrical member 240 or the filter 250, and the drain pipe 201 of the first embodiment.

Figure 11A:
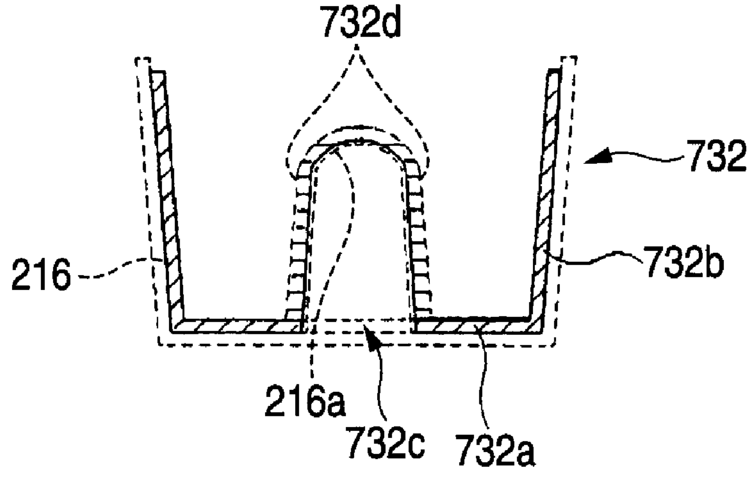
FIG. 11A through FIG. 11B are views for explaining a portion of collecting a processing refuse.

Further, a collecting portion 732 for collecting the processing refuse is put to inside of the dewatering tank 216. Details of the collecting portion 732 will be explained in reference to FIG. 11A and FIG. 11B. FIG. 11A shows a sectional view. The collecting portion 732 comprises a bottom portion 732*a* having an opening portion 732*c* inserted with the rotating shaft upper portion surface 216*a* of the dewatering tank 216 and a side wall portion 732*b*. Further, the collecting portion 732 comprises nonwoven cloth. Therefore, when covered on the dewatering tank 216, the collecting portion 732 is brought into close contact therewith more easily than a vinyl bag to be able to reduce unpreferable wrinkles from being brought about. There is a case in which the wrinkles cause to generate unpreferable vibration in rotating the dewatering tank 216 and therefore, the nonwoven cloth capable of restraining the wrinkle from being brought about is further suitable for the material of the collecting portion 732.

Further, in collecting the processing refuse, by an influence of the centrifugal force by rotating the dewatering tank 216, the processing refuse is stored from the outer periphery to the inner periphery of the dewatering tank 216. Therefore, an inconvenience in view of use is not brought about even when an inner side wall portion (illustrated by dotted line) 732*d* for covering the rotating shaft upper portion surface 216*a* is not constituted. Therefore, according to the embodiment, the collecting portion 732 is constituted only by the bottom portion 732*a* and the side wall portion 732*b* on the outer peripheral side. Further, the collecting portion 732 can repeatedly be used.

Figure 11B:
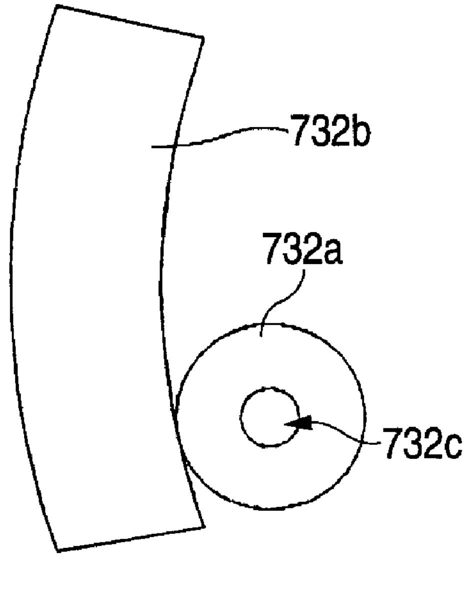

By constructing the collecting portion 732 by a constitution of only of the bottom portion 732*a* and the side wall portion 732*b* as in the embodiment, the constitution becomes effective for reducing cost by restraining an area or the nonwoven cloth. Further, as shown by FIG. 11B, the collecting portion 732 can be formed by cutting the bottom portion 732*a* and the side wall portion 732*b* from one sheet of nonwoven cloth to paste together. Therefore, an advantage of dispensing with time and labor of three-dimension molding or the like is also achieved. Furthermore, although the collecting portion 732 comprises nonwoven cloth, the invention is not limited thereto but the collecting portion 732 may be made of a rubber or the like capable of collecting the processing refuse.

When the processing refuse is taken out, as described above, by dewatering, the processing refuse is formed in a doughnut-like shape to remain as a block at the collecting portion 732. Therefore, the operator can pull up to take out the collecting portion 732.

Further, in FIG. 8, a drain water guide 772 in a circular arc shape is arranged at the ceiling plate 205*a* disposed above the centrifugal separator 206. The drain water guide 772 directly receives the grinding water sprung to outside of the dewatering tank 216 by passing the opening 602 of the filter 600. The guide 772 is used as a guide for guiding the grinding water efficiently to the circulating tank 213 installed at a side of the centrifugal separator 206.

Figure 12:
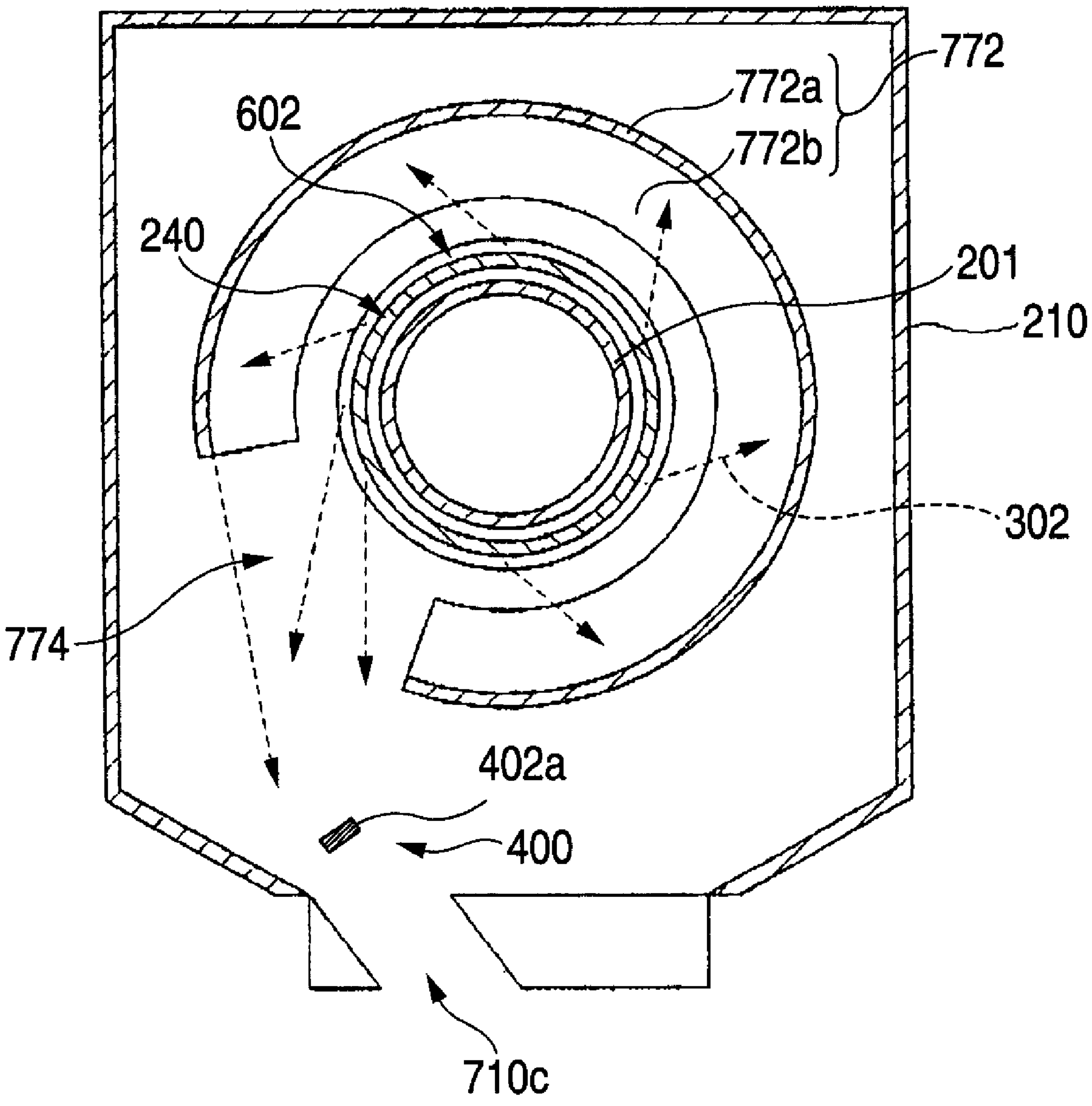
FIG. 12 is a view for explaining a drain guide.

FIG. 12 is a view viewing the drain water guide 772 shown in FIG. 8 from an A-A section. The drain water guide 772 is constituted by a side wall portion 772*a* in a circular arc shape and a bottom portion 772*b*. A center of the drain water guide 772 coincides with a center of rotation of the centrifugal separator 206. The side wall portion 772*a* is formed by a size to a degree the same as that of the outer shape of the filter 600. Further, an inner diameter of the bottom portion 772*b* for temporarily holding the grinding water to flow is formed to be larger than the opening 602 of the filter 600. Thereby, the grinding water sprung from the opening 602 can be received without scattering the grinding water to inside of the collecting case 210. It is preferable that a distance between the second filter holding portion 266 and the bottom portion 772*b* is a distance as short as possible while ensuring a gap to a degree of making water brought into the misty-like state by the filter 600 flow.

Further, the drain water guide 772 in the circular arc shape is formed with a cut 774 for concentrically guiding the grinding water in the direction of the connecting hole 210*c* provided to the collecting case 210. The grinding water sprung from the opening 602 of the filter 600 is swirled in an arrow mark 302 direction constituting a rotational direction the same as that of the dewatering tank 216 (in FIG. 12, rotational direction in the counterclockwise direction) while being held temporarily on an inner side of the drain water guide 772. Further, a large portion of the grinding water guided by the drain water guide 772 is sprung by the cut 774 to flow efficiently to the drain outlet 710*c* directed to the connecting hole 210*c*. A positional relationship between the drain outlet 710*c* and the cut 774 is set according to a speed of the grinding water flowing by being sprung in the arrow mark 302 by a speed of rotating the dewatering tank 216. Further, an upper portion of the drain water guide 772 is closed by the lower surface of the ceiling plate 205*a*.

By providing the drain water guide 772, even when a large amount of the processing refuse is stored at the dewatering tank 216 and an amount of the grinding water sprung from the opening 602 is temporarily increased, the grinding water is not scattered at inside of the collecting case 210. Furthermore, the grinding water can be made to flow to the side of the drain outlet 710*c* efficiently without increasing the amount of the grinding water received by the bottom portion of the collecting case 210. Further, the dewatering tank 216 is constituted by a rotating member, and therefore, a gap is formed at the bottom portion of the collecting case 210 and the dewatering tank 216. Therefore, when an amount of the grinding water received by the bottom portion of the collecting case 210 is increased, the grinding water is leaked from the gap. However, by the drain water guide 772, an amount of the leaked grinding water can be reduced.

Further, according to the second embodiment, the processing refuse amount detecting mechanism 400 explained with reference to FIG. 4 is provided on a path in which the grinding water is directed to the side of the drain outlet 710*c* from the cut 774. In FIG. 12, the plate 402*a* of the processing refuse amount detecting mechanism 400 is shown.

Meanwhile, there is a case in which the grinding water flowing out from the drain water guide 772 impinges on the plate 402*a* powerfully even when a capacity of treating the processing refuse by the centrifugal separator 206 does rot reach a limit. Further, there is a dependency between a time period required for pressing the microswitch 410 from starting to rotate the dewatering tank 216 (that is, starting to supply by starting to drive the suction pump 214) and an amount of the processing refuse collected at inside of the dewatering tank 216. When the amount of the processing refuse is large, the switch 410 is pressed by a short time period, and when the amount of the processing refuse is comparatively small, a long time period is required until pressing the switch 410.

Therefore, the corresponding relationship between the time period and the amount of the processing refuse is stored to the control portion 420. Further, the control portion 420 measures the time period required until pressing the microswitch 410 from starting to drive the pump 214 in cooperation with driving the motor 225. Further, based on the provided measurement time period, the operator is informed of a guide of a timing of interchanging the processing refuse (degree of storing processing refuse) by the display lap 421 or the buzzer 422.

Furthermore, the finer the processing refuse, the more clogged the filter 600. This signifies that even when the amount of the processing refuse collected to inside of the dewatering tank 216 is small, the switch 410 tends to be pressed. Further, a fineness of the processing refuse is caused by the material of the lens.

Hence, the operator inputs a statement that an onset is constituted by a state in which the processing refuse is not included at inside of the dewatering tank 216 to the control portion 420 by operating a switch on the side of the processing apparatus main body 1.

A characteristic value is set to be small such that a characteristic value of a material which makes the processing refuse liable to be fine as in, for example, a lens material of CR-39. On the other hand, a characteristic value of a highly refractive lens having a refractive index of 1.67 is set to be large. In this way, characteristic values for respective lens materials are stored to the control portion 420.

Further, at each time of processing a lens, the control portion 420 carries out an operation of successively adding the characteristic value in correspondence with the lens material based on the input to a lens material inputting portion provided on the side of the processing apparatus main body 1.

It is conceivable that the clogging of the filter 600 is caused by a fine processing refuse when the switch 410 is pressed and a result of calculating the characteristic value is smaller than a predetermined value. Therefore, the operator is informed that even when the switch 410 is pressed, there is an allowance of a space capable of holding the processing refuse at inside of the dewatering tank 216 by the display lamp 421 or the buzzer 422.

Or, in this case, there may be constructed a constitution of not informing the operator by the display lamp 421 or the like even when the switch 410 is pressed. In this way, a timing of informing the degree of storing the processing refuse may be corrected by the lens material.

Figure 13:
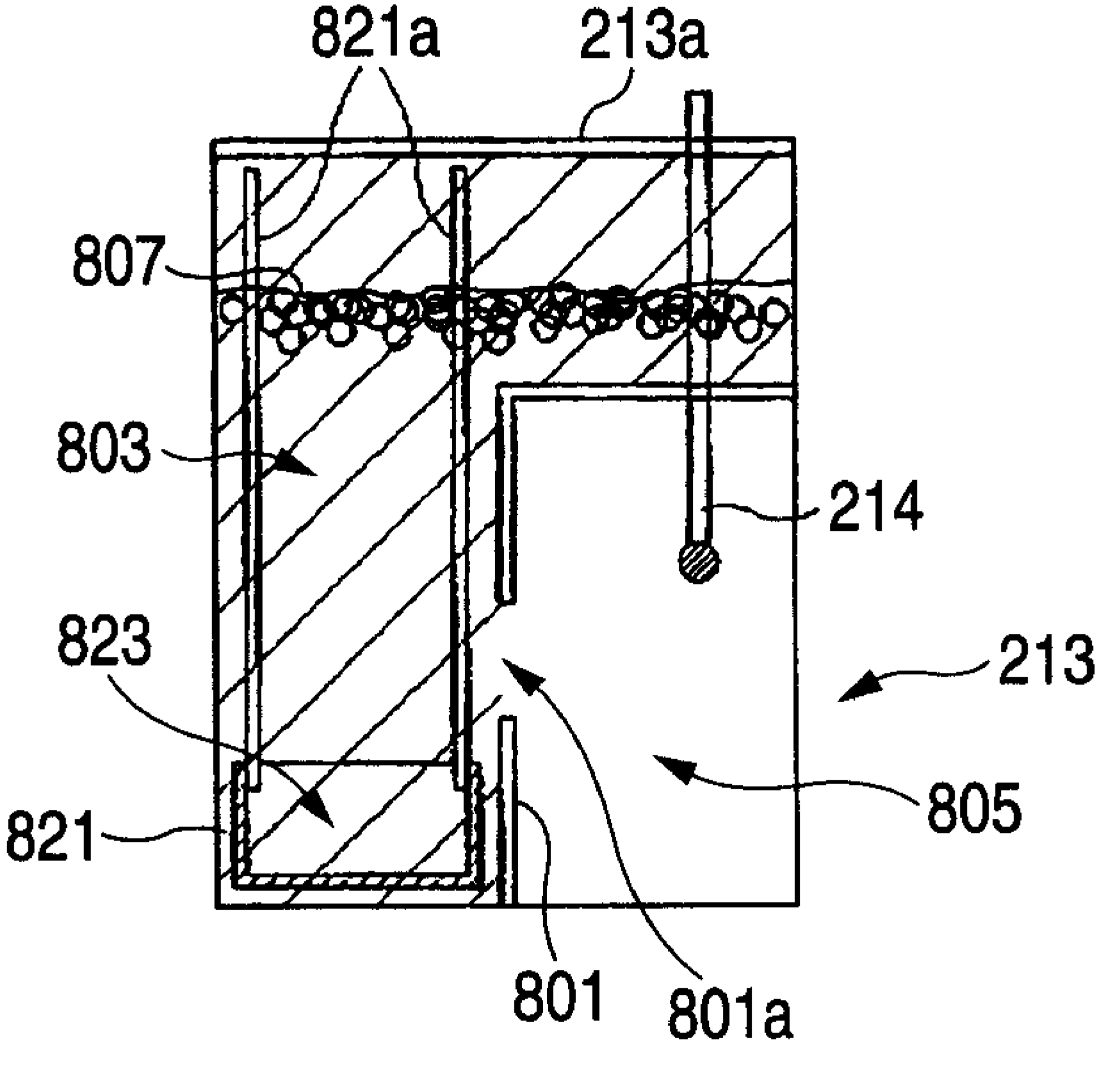
FIG. 13 is a view for explaining a tank.

Next, FIG. 13 shows a sectional view of the tank 213. The tank 213 is separated to a drain water casting chamber 803 shown on the left side and a water sucking chamber 805 shown on the right side by a partitioning plate 801. Furthermore, the water sucking chamber 805 is partitioned to the lower side by the ceiling plate 213*a* of the tank 213 by the partitioning plate 801 (in the following, the drain water casting chamber 803 is constituted by a region other than the water sucking chamber 805 at inside of the tank 213 as shown by hatchings in the drawing). Thereby, bubbles 807 stored on a water level of the drain water casting chamber 803 can be received by a wide area, and therefore, there is achieved an effect of facilitating to disperse the unpreferable bubbles in filtering the grinding water.

Further, a bottom portion of the drain water casting chamber 803 is provided with a filter holding member 821 having a number of holes. Further, the filter holding member 821 is provided with a filter 823. The operator can easily recover the processing refuse collected by the filter 823 by holding grabbing portions 821*a* fixedly attached to the holding member 821 to pull up to the upper side.

Furthermore, when the fine processing refuse difficult to be collected even by the filter 823 is intended to recover, an aggregating agent may be cast to the drain water casting chamber 803. Generally, it is necessary to cast an aggregating agent to a solution mixed with an object of aggregation and thereafter agitate the solution. According to the embodiment, agitation can be carried out by rocking the holding member 821 in an up and down direction by holding the grabbing portions 821*a*.

Further, in the drain water casting chamber 803, an upper side is constituted by a region including much of bubbles. And a lower side is constituted by a region having much of the processing refuse or a precipitate of an aggregate in the chamber 803. At a middle layer of the casting chamber 803, bubbles or an impurity of a precipitate or the like is provided the least.

Further, the partitioning plate 801 is provided with a gap 801*a* for ensuring a flow path on which the grinding water flows to the side of the water sucking chamber 805 at a position of the middle layer having a small amount of the impurity. Thereby, the grinding water having a small amount of the impurity is sucked from the pump 214.

Further, in the above-described embodiment, the materials of the filters 250, 600 are not limited to nonwoven cloth. As a material, a nylon filter may be used. However, generally, the nylon filter is expensive. Therefore, when the nylon filter cannot be used repeatedly by a number of times, the nylon filter is economically disadvantageous. In contrast thereto, the nonwoven cloth can be obtained very inexpensively. Therefore, the nonwoven cloth is economically preferable even when the nonwoven cloth is interchanged at each time of throwing away the processing refuse (or by using the nonwoven cloth by 2 times of head and tail thereof).

An experiment is carried out by using a filter of nonwoven cloth having an air flow quantity of 92 ($cm^3/cm^2\cdot sec$). As result, transparency of filtered grinding water is high. Further, when an experiment is carried out by using nonwoven cloth having an air flow quantity of 114 ($cm^3/cm^2\cdot sec$), filtered grinding water is slightly turbid. However, although the filtered grinding water is used by circulating back to the tank 213, bubbles are not brought about at inside of the tank 213. Furthermore, even in mirror finish processing by a lens periphery processing apparatus, the processed surface is fine. Therefore, it seems that a large processing refuse is filtered. However, in a filter of nonwoven cloth considerably exceeding the air flow quantity of 114 ($cm^3/cm^2\cdot sec$), the grinding water is much turbid and bubbles are liable to be brought about at inside of the tank 213 by circulating the grinding water. According to the experiment, the filter of the nonwoven cloth having the air flow quantity of 120 ($cm^3/cm^2\cdot sec$) or less is preferable.

Next, an experiment is carried out by using a filter of nonwoven cloth having an air flow quantity of 62 ($cm^3$/$cm^2$·sec). As a result, transparency of filtered grinding water is very high. Although a dewatering efficiency is rather inferior to that of a filter having an air flow quantity of 92 ($cm^3$/$cm^2$·sec), the grinding water put into the dewatering tank 216 is drained from the filter. However, when a roughness (air flow quantity) of the filter of the nonwoven cloth is considerably reduced excessively, depending on the processing refuse, the filter is liable to be clogged. Therefore, an amount of the grinding water capable of passing the filter is reduced and the dewatering efficiency is reduced. When the dewatering efficiency is reduced, the grinding water brought to the dewatering tank 216 is difficult to be drained from the filter, and the grinding water including the processing refuse is liable to overflow from the gap between the inner side of the filter and the drain pipe 201. According to the experiment, the filter of the nonwoven cloth up to the air flow quantity of 60 ($cm^3$/$cm^2$·sec) is preferable.

Further, an experiment is also carried out by using a filter. The filter is made of nylon for passing a processing refuse equal to or smaller than 11 μm. At this occasion, filtered grinding water is clean water. However, the filter becomes liable to be clogged even at the stage in which mach of the processing refuse is not stored to the dewatering tank 216. At this occasion, the grinding water is difficult to pass the filter. Therefore, the grinding water including the processing refuse is liable to overflow from the gap between inside of the filter and the drain pipe 201. By the above-described experimental result, it is known that even in a filter of nonwoven cloth having an air flow quantity of about 60 ($cm^3$/$cm^2$·sec), the filtering function is constituted by a size of exceeding 11 μm.

What is claimed is:

1. A grinding water treating apparatus for separating processing refuse of an eyeglass lens from grinding water used for processing a periphery of the eyeglass lens, the grinding water containing the processing refuse being introduced from an eyeglass lens processing apparatus, the grinding water treating apparatus comprising:

a lens grinding chamber having a drain pipe for the grinding water containing the processing refuse;

a centrifugal separator that includes a dewatering tank having a bottom surface and a side surface and a drive source for rotating the dewatering tank, and springs out the grinding water through an upper portion of the dewatering tank by rotating the dewatering tank; and wherein the drain pipe introduces the grinding water containing the processing refuse from the grinding chamber into the dewatering tank, the centrifugal separator includes a ring-like shaped filter covering the upper portion of the dewatering tank and having an opening inserted with the drain pipe, for filtering the grinding water separated from the processing refuse by collecting the processing refuse at a lower portion of the filter and springing out the grinding water to an upper portion of the filter by rotating the dewatering tank.

2. The grinding water treating apparatus according to claim 1, wherein an interval between the filter and the drain pipe includes a gap for overflowing the grinding water which cannot be filtered by the filter when the processing refuse is stored in the dewatering tank, the gap having a size in which a water amount overflowed through the gap exceeds a water amount introduced from the drain pipe.

3. The grinding water treating apparatus according to claim 1, wherein the filter is formed by a nonwoven cloth and is provided with an air flow quantity of 60-110 $cm^3$/$cm^2$·sec.

4. The grinding water treating apparatus according to claim 1, wherein the dewatering tank includes a center bottom portion projected to an upper side of a peripheral bottom portion, and the drain pipe or a surrounding of the drain pipe includes a grinding water introducing guide extended to a position lower than a topmost portion of the center bottom portion for guiding the grinding water to the center bottom portion.

5. The grinding water treating apparatus according to claim 4, wherein the filter includes an opening having a diameter larger than an inner diameter of the grinding water introducing guide, and the opening forms a gap between the filter and the grinding water introducing guide, the gap having a size of passing the processing refuse along with the grinding water which cannot be filtered by the filter when the processing refuse is stored in the dewatering tank.

6. The grinding water treating apparatus according to claim 1, further comprising a cylindrical member surrounding the drain pipe inserted to the opening of the filter, the cylindrical member being projected to a lower side of the filter.

7. The grinding water treating apparatus according to claim 6, wherein a lower side opening of the drain pipe is disposed on a lower side of a lower side opening of the cylindrical member.

8. The grinding water treating apparatus according to claim 1, wherein the filter is constituted by a shape of plane brought into a positional relationship substantially in a vertical direction relative to a rotating shaft of the dewatering tank.

* * * * *